United States Patent

Kobayashi et al.

(10) Patent No.: US 8,192,821 B2
(45) Date of Patent: Jun. 5, 2012

(54) ULTRAVIOLET-CURABLE RESIN COMPOSITION AND USE THEREOF

(75) Inventors: Daisuke Kobayashi, Tokyo (JP); Kiyohisa Tokuda, Tokyo (JP); Masahiro Naito, Tokyo (JP); Go Mizutani, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 813 days.

(21) Appl. No.: 12/308,006

(22) PCT Filed: Jul. 9, 2007

(86) PCT No.: PCT/JP2007/063675
§ 371 (c)(1),
(2), (4) Date: Dec. 4, 2008

(87) PCT Pub. No.: WO2008/007641
PCT Pub. Date: Jan. 17, 2008

(65) Prior Publication Data
US 2009/0155516 A1    Jun. 18, 2009

(30) Foreign Application Priority Data

Jul. 10, 2006    (JP) .................................. 2006-189118

(51) Int. Cl.
*B32B 3/02*    (2006.01)
*G11B 7/24*    (2006.01)

(52) U.S. Cl. ....... 428/65.1; 522/169; 522/182; 526/266; 526/282; G9B/7.175; 428/64.4

(58) Field of Classification Search ................. 428/64.4, 428/65.1; 522/169, 183, 182; 526/266, 282, 526/320, 323.2, 325.5; G9B/7.175
See application file for complete search history.

(56) References Cited

U.S. PATENT DOCUMENTS

| 5,102,709 | A | * | 4/1992 | Tachibana et al. | ........... 428/65.1 |
| 5,503,889 | A | * | 4/1996 | Imataki | ........................ 428/64.1 |
| 6,265,133 | B1 | * | 7/2001 | Takahashi et al. | ......... 430/281.1 |
| 2004/0184397 | A1 | | 9/2004 | Saito et al. | ................. 369/275.4 |
| 2006/0074209 | A1 | | 4/2006 | Mizutani et al. | |
| 2008/0152857 | A1 | * | 6/2008 | Mizutani et al. | ............. 428/65.1 |

FOREIGN PATENT DOCUMENTS

| CN | 1392551 | | 1/2003 |
| EP | 1 388 852 | A1 | 2/2004 |
| EP | 1 566 422 | A1 | 8/2005 |
| JP | 5-59139 | | 3/1993 |
| JP | 5-132506 | | 5/1993 |
| JP | 5-132534 | | 5/1993 |
| JP | 5-140254 | | 6/1993 |
| JP | 7-210899 | | 8/1995 |
| JP | 2003-85839 | | 3/2003 |
| JP | 2003-109251 | | 4/2003 |
| JP | 2003-331463 | | 11/2003 |
| JP | 2004-175866 | A | 6/2004 |
| JP | 2004-288242 | | 10/2004 |
| JP | 2004-288264 | | 10/2004 |
| JP | 2005-332564 | | 12/2005 |
| WO | 03/012784 | | 2/2003 |
| WO | 2006/019023 | A1 | 2/2006 |

OTHER PUBLICATIONS

Japanese office action dated Jul. 22, 2010 in co-pending foreign application (JP2008-524788).
International Search Report dated Oct. 2, 2007.
European communication dated Aug. 24, 2010 in a corresponding foreign application (EP07790496.9).

* cited by examiner

*Primary Examiner* — Gerard Higgins
(74) *Attorney, Agent, or Firm* — Nields, Lemack & Frame, LLC

(57) ABSTRACT

Disclosed is an ultraviolet-curable resin composition for multilayer optical discs, which contains (A) dioxane glycol di(meth)acrylate and/or tricyclodecane dimethylol di(meth)acrylate, and (B) a photopolymerization initiator.

9 Claims, No Drawings

ULTRAVIOLET-CURABLE RESIN COMPOSITION AND USE THEREOF

TECHNICAL FIELD

The present invention relates to an ultraviolet-curable resin composition to form a transparent resin intermediate layer in a multilayer optical disc having at least two recording layers and a multilayer optical disc having as a transparent resin intermediate layer a curing product of the composition.

BACKGROUND ART

In these years, demand for large-capacity optical discs has been growing remarkably. Examples of the technique to increase the recording capacity of optical discs include a method which adopts shorter wavelengths for the recording/reproducing beam, a method which adopts a higher NA (number of aperture) for the objective lens in the recording/reproducing beam irradiation optical system, and a method which adopts multiple layers for the recording layer. Among these, the adoption of the multiple layers for the recording layer enables the optical disc to have a large capacity in a lower cost than the adoption of the shorter wavelengths or the adoption of the higher NA.

For example, a DVD or HD-DVD disc having two recording layers adopts a structure in which the two recording layers are laminated together with the intermediary of a transparent resin intermediate layer. Specifically, the structure as viewed from the incident side of the recording/reproducing beam is such that a first 0.6-mm transparent resin substrate, a first recording layer, a first translucent reflecting layer, the transparent resin intermediate layer, a second recording layer, a second reflecting layer, an adhesive layer and a second 0.6-mm transparent resin substrate are laminated in this order; wherein the transparent resin intermediate layer is formed as follows: an ultraviolet-curable resin composition is applied to the first translucent reflecting layer, pressed against a transparent resin stamper having an asperity pattern including the guide grooves for guiding the recording/reproducing beam and cured with ultraviolet light, and thereafter the stamper is released and thus the asperity pattern is transferred to the surface of the cured product to form the transparent resin intermediate layer.

A BLU-RAY optical disc having two recording layers has a structure as viewed from the incident side of the recording/reproducing beam is such that a 0.1-mm light transmissive layer, a first recording layer, a first translucent reflecting layer, a transparent resin intermediate layer, a second recording layer, a second reflecting layer and a 1.1-mm resin substrate are laminated in this order; wherein the transparent resin intermediate layer is formed as follows: an ultraviolet-curable resin composition is applied to the second recording layer, pressed against a transparent resin stamper having an asperity pattern including the guide grooves for guiding the recording/reproducing beam and cured with ultraviolet light, and thereafter the stamper is released and thus the asperity pattern is transferred to the surface of the cured product to form the transparent resin intermediate layer.

In general, the above-described transfer method is referred to as the 2P (Photo Polymerization) method, and the ultraviolet-curable resin composition used in the 2P method is referred to as the 2P resin.

Examples of the resin for the transparent resin stamper include acrylic resin, methacrylic resin, polycarbonate resin, polyolefin resin (in particular, amorphous polyolefin), polyester resin, polystyrene resin and epoxy resin. From the viewpoints of the properties of the 2P resin after curing such as the mold-release performance, the low hygroscopic property and the shape stability, preferable among these is amorphous polyolefin; from the viewpoint of the material cost, preferable among these is polycarbonate resin.

In general, polycarbonate resin is used for the 0.6-mm resin substrate in a DVD or HD-DVD disc and for the 1.1-mm resin substrate in a BLU-RAY optical disc. When polycarbonate resin is used as the transparent resin stamper, the application of an ultraviolet-curable resin other than the 2P resin to the resin substrate side facilitates the release of the resin stamper made of polycarbonate from the 2P resin layer having been cured.

The properties required for the 2P resin are as follows:

(i) Satisfactory mold-release performance from the transparent resin stamper;

(ii) Satisfactory transfer performance from the transparent resin stamper;

(iii) Small warping of the disc substrate after ultraviolet curing;

(iv) No deformation of the transferred asperity pattern under high temperature and high humidity; and (v) Particularly in an optical disc having a recording layer made of a dye, no diffusion of the dye into the transparent resin intermediate layer under high temperature and high humidity.

Poor mold-release performance from the transparent resin stamper partially exfoliates the transparent resin intermediate layer together with the transparent resin stamper to cause defects. Poor transfer performance causes errors at the time of recording/reproducing. Large warping of the disc substrate after ultraviolet curing causes the following problems: the recording layer or the reflecting layer cannot be uniformly formed on the formed asperity pattern; lamination of the second substrate is disturbed in the case of a DVD or HD-DVD disc; and uniform formation of the 0.1-mm light transmissive layer is disturbed in the case of the BLU-RAY optical disc. Moreover, the deformation of the asperity pattern under high temperature and high humidity or the diffusion of the dye into the transparent resin intermediate layer leads to nonequivalence in recording properties (for example, jitter properties) between the first and second recording layers.

The 2P resin described in any of Patent Documents 1 to 4 undergoes the asperity pattern formation on a glass substrate with a metal stamper; none of these Patent Documents describes the asperity pattern formation with a transparent resin stamper. Additionally, Patent Documents 5 to 8 each include a description of the 2P resin without including any description of the resin according to the present invention.

Patent Document 1: JP-A-5-59139
Patent Document 2: JP-A-5-132534
Patent Document 3: JP-A-5-140254
Patent Document 4: JP-A-5-132506
Patent Document 5: JP-A-2003-331463
Patent Document 6: JP-A-2004-288242
Patent Document 7: JP-A-2004-288264
Patent Document 8: JP-A-2005-332564

DISCLOSURE OF THE INVENTION

An object of the present invention is to provide an ultraviolet-curable resin composition that yields in a multilayer optical disc a cured product which is excellent in the transfer performance of the asperity pattern of the transparent resin stamper and excellent in the mold-release performance from the transparent resin stamper, and thus yields a multilayer optical disc high both in durability and in the dye-diffusion suppression ability.

The present inventors continuously made a diligent study for the purpose of solving the above-described problems, and consequently perfected the present invention by discovering that an ultraviolet-curable resin composition having a specific composition is suitable for the 2P resin.

More specifically, the present invention relates to the following aspects (1) to (11).

(1) An ultraviolet-curable resin composition for a multilayer optical disc including
(A) dioxane glycol di(meth)acrylate and/or tricyclodecane dimethylol di(meth)acrylate, and
(B) a photopolymerization initiator.
(2) The ultraviolet-curable resin composition for a multilayer optical disc according to (1), further including (C) a compound having in the molecule thereof at least two (meth)acryloyl groups.
(3) The ultraviolet-curable resin composition for a multilayer optical disc according to (2), including 15 to 85% by weight of the (A) component, 0.1 to 10% by weight of the (B) component and 10 to 80% by weight of the (C) component in relation to the weight of the whole resin composition.
(4) The ultraviolet-curable resin composition for a multilayer optical disc according to (2), further including (D) a mono(meth)acrylate compound.
(5) The ultraviolet-curable resin composition for a multilayer optical disc according to (4), including 15 to 85% by weight of the (A) component, 0.1 to 10% by weight of the (B) component, 8 to 80% by weight of the (C) component and 5 to 40% by weight of the (D) component in relation to the weight of the whole resin composition.
(6) The ultraviolet-curable resin composition for a multilayer optical disc according to any one of (2) to (5), wherein the compound (C) including in the molecule thereof at least two or more (meth)acryloyl groups includes one or more selected from the group consisting of trimethylolpropane triacrylate, pentaerythritol triacrylate, ditrimethylolpropane tetraacrylate, tris[acroyloxyethyl]isocyanurate, dipentaerythritol hexaacrylate, tripropylene glycol diacrylate and neopentylglycol polypropoxy diacrylate.
(7) The ultraviolet-curable resin composition for a multilayer optical disc according to any one of (4) to (6), wherein the mono(meth)acrylate compound (D) includes one or more selected from the group consisting of dicyclopentenyl oxyethyl acrylate, lauryl acrylate and methoxytripropylene glycol acrylate.
(8) The ultraviolet-curable resin composition for a multilayer optical disc according to any one of (1) to (4), wherein the photopolymerization initiator (B) is 1-hydroxy-cyclohexyl phenyl ketone or 2,4,6-trimethylbenzoyl diphenyl phosphine oxide.
(9) The ultraviolet-curable resin composition for a multilayer optical disc according to any one of (1) to (5), wherein the viscosity of the composition at 25° C. measured with a B-type viscometer is 30 to 800 mPa·s.
(10) A cured product obtained by irradiating with an actinic radiation the ultraviolet-curable resin composition for a multilayer optical disc according to any one of (1) to (6).
(11) A multilayer optical disc including the cured product according to (10).

The ultraviolet-curable resin composition of the present invention can provide, in a multilayer optical disc having at least two recording layers, a transparent resin intermediate layer which is excellent both in the transfer performance of the asperity pattern of the transparent resin stamper and in the mold-release performance from the transparent resin stamper. Moreover, the multilayer optical disc having such a transparent resin intermediate layer exhibits durability and dye-diffusion suppression ability even under high temperature and high humidity, and hence the multilayer optical disc can be obtained stably with satisfactory productivity.

BEST MODE FOR CARRYING OUT THE INVENTION

Hereinafter, the present invention will be described in detail. The (A) component used in the present invention, namely, dioxane glycol di(meth)acrylate and/or tricyclodecane dimethylol di(meth)acrylate is essential for ensuring the above-described properties (i) to (v) required for the 2P resin. In particular, dioxane glycol di(meth)acrylate is excellent in the mold-release performance from a transparent resin stamper made of polycarbonate resin.

As dioxane glycol di(meth)acrylate, a commercially available product may be used; examples of such a commercially available product include KAYARAD R-604 (manufactured by Nippon Kayaku Co., Ltd.).

As tricyclodecane dimethylol di(meth)acrylate, a commercially available product may be used; examples of such a commercially available product include KAYARAD R-684 (manufactured by Nippon Kayaku Co., Ltd.).

When dioxane glycol di(meth)acrylate and tricyclodecane dimethylol di(meth)acrylate are used as an admixture, the mixing ratio therebetween can be optionally varied according to the shape (warping) of the first substrate and the asperity pattern of the resin stamper. Preferably the admixture is composed of 3 to 97% by weight of tricyclodecane dimethylol di(meth)acrylate and 97 to 3% by weight of dioxane glycol di(meth)acrylate.

The amount of the (A) component used, in relation to the weight of the whole resin composition of the present invention, is usually 10 to 98% by weight, and preferably 15 to 85% by weight. When the amount is less than 10% by weight, the transfer performance from the transparent resin stamper may be degraded or the warping of the disc substrate may be large; when the amount is larger than 98% by weight, the curability may be insufficient.

Examples of the photopolymerization initiator (B) component used in the composition of the present invention include: benzophenone, 1-hydroxy-cyclohexyl phenyl ketone, 2-hydroxy-2-methyl-1-phenyl-propan-1-one, 2,2-dimethoxy-1,2-diphenylethan-1-one, 2-methyl-1-[4-(methylthio)phenyl]-2-morpholinopropan-1-one, 2-benzyl-2-dimethylamino-1-(4-morpholinophenyl)-butan-1-one, bis(2,6-dimethoxybenzoyl)-2,4,4-trimethylpentyl phosphine oxide, bis(2,4,6-trimethylbenzoyl)phenyl phosphine oxide and 2,4,6-trimethylbenzoyl diphenyl phopshine oxide. Preferable are 1-hydroxy-cyclohexyl phenyl ketone and 2,4-6-trimethylbenzoyl diphenyl phosphine oxide both of which are satisfactory in mold-release performance from the transparent resin stamper.

The amount of the photopolymerization initiator (B) component used, in relation to the weight of the whole resin composition of the present invention, is usually 0.1 to 10% by weight, and preferably 1 to 8% by weight. When the amount is less than 0.1%, the curability may be insufficient, and when the amount is larger than 10% by weight, the mold-release performance from the transparent resin stamper may be degraded.

Additionally, the photopolymerization initiator may be used in combination with a curing accelerator. Specific examples of the curing accelerator usable in combination include: amines such as triethanol amine and diethanol amine; and hydrogen donors such as mercaptobenzothiazole. The amount of the curing accelerator used in combination is usually 0.2 to 5% by weight in relation to the weight of the whole resin composition of the present invention.

The (C) component used in the present invention, namely, the compound having in the molecule thereof at least two (meth)acryloyl groups is used for the purpose of enhancing the ability of suppression of the dye diffusion into the transparent resin intermediate layer under high temperature and high humidity. Examples of the (C) component include: tripropylene glycol diacrylate, 1,6-hexanediol di(meth)acrylate, neopentyl glycol di(meth)acrylate, 1,9-nonanediol di(meth)acrylate, neopentyl glycol polypropoxy di(meth) acrylate, hydroxypivalic acid neopentyl glycol di(meth)acrylate, bisphenol A polyethoxy di(meth)acrylate, bisphenol F polyethoxy di(meth)acrylate, polyethylene glycol di(meth) acrylate, bis[(meth)acryloyloxyethyl]hydroxyethyl isocyanurate, trimethylolpropane tri(meth)acrylate, trimethyloloctane tri(meth)acrylate, trimethylolpropane polyethoxy tri (meth)acrylate, trimethylolpropane polypropoxy tri(meth) acrylate, trimethylolpropane polyethoxy polypropoxy tri (meth)acrylate, tris[(meth)acroyloxyethyl]isocyanurate, pentaerythritol tri(meth)acrylate, pentaerythritol polyethoxy tetra(meth)acrylate, pentaerythritol polypropoxy tetra(meth) acrylate, pentaerythritol tetra(meth)acrylate, ditrimethylolpropane tetra(meth)acrylate, dipentaerythritol tetra(meth) acrylate, dipentaerythritol penta(meth)acrylate, dipentaerythritol hexa(meth)acrylate, caprolactone-modified dipentaerythritol penta(meth)acrylate, caprolactone-modified dipentaerythritol hexa(meth)acrylate, caprolactone-modified tris[(meth)acryloyloxyethyl]isocyanurate, and a reaction product between a compound having a hydroxyl group and two or more (meth)acryloyl groups and a compound having two or more isocyanate groups. Preferable among these are trimethylolpropane triacrylate (KAYARAD TMPTA, manufactured by Nippon Kayaku Co., Ltd.), pentaerythritol triacrylate (KAYARAD PET-30, manufactured by Nippon Kayaku Co., Ltd.), ditrimethylolpropane tetraacrylate (KAYARAD T-1420(T), manufactured by Nippon Kayaku Co., Ltd.), tris[acryloyloxyethyl]isocyanurate (M-315, manufactured by Toa Gosei Co., Ltd.), dipentaerythritol hexaacrylate (KAYARAD DPHA, manufactured by Nippon Kayaku Co., Ltd.), tripropylene glycol diacrylate, and neopentyl glycol polypropoxy diacrylate (New Frontier NPG-2P, manufactured by Dai-ichi Kogyo Seiyaku Co., Ltd.).

The amount of the (C) component used, in relation to the weight of the whole resin composition of the present invention, is usually 8 to 80% by weight, preferably 10 to 80% by weight and more preferably 12 to 75% by weight. When the amount is 8% by weight or less, the effect to suppress the dye diffusion under high temperature and high humidity is degraded, and when the amount is larger than 80% by weight, the crosslink density may be increased and the warping of the disc may be large.

The (D) component used in the present invention, namely, a mono(meth)acrylate compound has a property of reducing the warping of the disc. Examples of the (D) component include tricyclodecane (meth)acrylate, dicyclopentenyloxyethyl (meth)acrylate, dicyclopentanyl (meth)acrylate, isobornonyl (meth)acrylate, adamantyl (meth)acrylate, lauryl acrylate, methoxytripropylene glycol (meth)acrylate, phenyloxyethyl (meth)acrylate, benzyl (meth)acrylate, tetrahydrofurfuryl (meth)acrylate, monopholine acrylate, phenyl glycidyl (meth)acrylate, 2-hydroxy (meth)acrylate and 2-hydroxy-3-phenoxypropyl (meth)acrylate. Preferable among these are dicyclopentenyloxyethyl acrylate, lauryl acrylate, and methoxytripropylene glycol acrylate. These compounds can be used each alone or as admixtures of two or more thereof in optional ratios.

The amount of the (D) component used, in relation to the weight of the whole resin composition of the present invention, is usually 5 to 40% by weight and preferably 10 to 30% by weight. When the amount is 5% by weight or more, the warping of the disc is decreased, and when the amount is larger than 40% by weight, the curability may be degraded.

In the present invention, in the case of the resin composition to which the (A) and (B) components are essential, the proportions of the (A) and (B) components may be approximately 10 to 98% by weight and 0.1 to 10% by weight, respectively, in relation to the weight of the whole resin composition.

On the other hand, in the case of the resin composition to which the (A), (B) and (C) components are essential, the proportions of the (A), (B) and (C) components may be approximately 15 to 85% by weight, 0.1 to 10% by weight and 10 to 80% by weight, respectively, in relation to the weight of the whole resin composition.

On the other hand, in the case of the resin composition to which the (A), (B), (C) and (D) components are essential, the proportions of the (A), (B), (C) and (D) components may be approximately 15 to 85% by weight, 0.1 to 10% by weight, 8 to 80% by weight and 5 to 40% by weight, respectively, in relation to the weight of the whole resin composition.

Additionally, in the present invention, epoxy acrylate, urethane acrylate, polyester acrylate and polycarbonate acrylate compounds may be used where necessary.

Further, in the present invention, in addition to the above-described components, the following additives may be used in combination where necessary: a silane coupling agent, a leveling agent, an antifoaming agent, a polymerization inhibitor, a light stabilizer (for example, a hindered amine), an antioxidant, an antistatic agent, a surface lubricant and a filler. Examples of such additives include: KBM-502, KBM-503, KBM-5103, KBM-802 and KBM-803 (manufactured by Shin-Etsu Chemical Co., Ltd.); BYK-333, BYK-307, BYK-3500, BYK-3530 and BYK-3570 (manufactured by BYK-Chemie Co., Ltd.), Z-6062, SH-6062 and SH-29PA (manufactured by Dow Corning Toray Co., Ltd.); and LA-82 (manufactured by Adeka Co., Ltd.).

The ultraviolet-curable resin composition of the present invention can be obtained by mixing and dissolving together the above-described individual components at a temperature ranging from room temperature to 80° C. and by thereafter filtering the mixture thus obtained where necessary.

The viscosity of the ultraviolet-curable resin composition of the present invention is 30 to 800 mPa·s and preferably 50 to 500 mPa·s as measured at 25° C. with a B-type viscometer. When the viscosity is less than 30 mPa·s, the thickness uniformity of the 2P resin layer can be hardly attained, and when the viscosity is larger than 800 mPa·s, it may take a long time to spin off the resin to degrade the productivity.

In the case of a DVD or HD-DVD disc, the transparent resin intermediate layer is formed by the following method (1): the resin composition of the present invention is applied to at least one of the transparent resin stamper and the substrate in which the first transparent resin substrate, the first recording layer and the first translucent reflecting layer are laminated, by a technique such as spin coating, screen printing or roll coating, thereafter the substrate and the transparent resin stamper are bonded to each other, and then ultraviolet light irradiation is conducted from the transparent resin stamper side. Alternatively, the transparent resin intermediate layer may be formed by the following method (2): the transparent resin stamper is coated with the resin composition of the present invention by means of the above-described technique, thereafter the resin composition is cured by ultraviolet light irradiation, and then the transparent resin stamper is bonded, with an optional ultraviolet-curable resin, to the substrate in which the first transparent resin substrate, the first recording layer and the first translucent reflecting layer are laminated. Preferable is the method (2), because it permits easily controlling the warping of the multilayer optical disc. The method (2) is preferable also from the viewpoint of the release performance from the transparent resin stamper. Also in a BLU-RAY optical disc, the transparent resin intermediate layer is formed in the same manner as in the case of a DVD or HD-DVD disc. In general, polycarbonate resin is used for the 0.6-mm first transparent resin substrate in a DVD or HD-DVD disc, or the 1.1-mm resin substrate in a BLU-RAY optical disc. Accordingly, the method (2) is preferable from the viewpoint of the release performance when a transparent resin stamper made of polycarbonate is used.

Examples of the resin for the transparent resin stamper include acrylic resin, methacrylic resin, polycarbonate resin, polyolefin resin (in particular, amorphous polyolefin), polyester resin, polystyrene resin and epoxy resin. From the viewpoints of the properties of the 2P resin after curing, such as the mold-release performance, the low hygroscopic property and the shape stability, preferable among these is amorphous polyolefin; from the viewpoint of the material cost, preferable among these is polycarbonate resin. The transparent resin stamper made of either amorphous polyolefin or polycarbonate resin may be used for the ultraviolet-curable resin composition of the present invention.

Actinic radiation irradiation to the ultraviolet-curable resin composition of the present invention provides a cured product. Examples of the actinic radiation include ultraviolet to near ultraviolet light. Examples of the actinic radiation source include a low-pressure, high-pressure or ultra-high pressure mercury lamp, a metal halide lamp, a (pulse) xenon lamp, an electrodeless lamp and an ultraviolet light emitting diode. The above-described cured product is also included in the present invention.

For the recording layer formed on the transparent resin intermediate layer made of the above-described cured product, either an organic dye or a phase-change material can be used. Examples of such an organic dye include metal-containing azo dyes, polymethine dyes and phthalocyanine dyes. Examples of such a phase-change material include materials made of Sb and Te, containing one or more additives selected from In, Ag, Au, Bi, Se, Al, P, Ge, H, Si, C, V, W, Ta, Zn, Ti, Ce, Tb, Sn and Pb.

Moreover, the resin composition of the present invention can be used for both optical discs and BLU-RAY optical discs having a structure in which a polycarbonate substrate is bonded.

EXAMPLES

Hereinafter, the present invention is described by taking as an example a DVD disc formed by using amorphous polyolefin resin or polycarbonate resin for the transparent resin stamper. The present invention is not limited to a DVD disc, but can also be applied to HD-DVD and BLU-RAY optical discs.

Examples 1 to 12 and Comparative Example 1

An ultraviolet-curable resin composition of each of Examples 1 to 12 and Comparative Examples 1, having the composition (parts by weight) shown in Table 1 was prepared. Also, for each of Examples 1 to 12 and Comparative Example 1, a second ultraviolet-curable resin composition having the same composition as that of the first ultraviolet-curable resin composition shown in Table 1 was prepared.

It is to be noted that the abbreviations used for the individual compositions shown in the table are as follows.

R-604: dioxane glycol diacrylate, manufactured by Nippon Kayaku Co., Ltd.

R-684: tricyclodecane dimethylol diacrylate, manufactured by Nippon Kayaku Co., Ltd.

TMPTA: trimethylolpropane triacrylate, manufactured by Nippon Kayaku Co., Ltd.

T-1420(T): ditrimethylolpropane tetraacrylate, manufactured by Nippon Kayaku Co., Ltd.

PET-30: pentaerythritol triacrylate, manufactured by Nippon Kayaku Co., Ltd.

M-315: tris[acryloyloxyethyl]isocyanurate (manufactured by To a Gosei Co., Ltd.

DPHA: dipentaerythritol hexaacrylate, manufactured by Nippon Kayaku Co., Ltd.

TPGDA: tripropylene glycol diacrylate, manufactured by Cognis Co., Ltd.

NPG-2P: neopentyl glycol polypropoxy diacrylate, manufactured by Dai-ichi Kogyo Seiyaku Co., Ltd.

LA: lauryl acrylate, manufactured by NFO Corp.

AM-30PG: methoxytripropylene glycol acrylate, manufactured by Shin-nakamura Chemical Co., Ltd.

FA-512A: dicyclopentenyl oxyethyl acrylate, manufactured by Hitachi Chemical Co., Ltd.

Irgacure 184: 1-hydroxy-cyclohexyl phenyl ketone, manufactured by Ciba Specialty Chemicals K.K.

Speed TPO: 2,4,6-trimethylbenzoyl diphenyl phosphine oxide (Preparation of Evaluation Samples A and B)

In each of Examples 1 to 12 and Comparative Example 1, an evaluation sample disc A was prepared by means of the following four methods 1 to 4 by using the obtained ultraviolet-curable resin composition.

(1) There was used a transparent resin stamper of 120 mm in diameter and 0.6 mm in thickness, having an asperity pattern shape of 0.74 μm in track pitch, 0.3 μm in land width and 200 nm in land height. The transparent resin stamper was made of an alicyclic polyolefin (trade name: ZEONOR 1060R, manufactured by Zeon Corp.) or a polycarbonate resin. To the inner periphery of the transparent resin stamper, 2.0 g of the ultraviolet-curable resin composition was supplied and spin coating was conducted so as for the thickness of the 2P resin layer to be 8 μm±2 μm. Thereafter, the coated ultraviolet-curable resin composition was irradiated with a high pressure mercury lamp (80 W/cm) in 600 mJ/cm$^2$, so that the ultraviolet-curable resin composition was cured.

(2) To the inner periphery of a polycarbonate substrate (the first substrate) of 120 mm in diameter and 0.6 mm in thickness in which an azo dye layer as the first recording layer and the first reflecting layer were formed, 2.5 g of KAYARAD DVD-575 (an ultraviolet-curable adhesive for use in DVD, manufactured by Nippon Kayaku Co., Ltd.) was supplied. Then, the transparent resin stamper prepared in the above (1) was placed over the supplied ultraviolet-curable adhesive in such a way that no air bubbles were incorporated, and bonded to the first substrate by conducting spin coating at 2000 rpm for 4 seconds.

(3) A high pressure mercury lamp (80 W/cm) was used for the irradiation from the transparent resin stamper side in 400 mJ/cm$^2$, and thus the second ultraviolet-curable resin composition was cured.

(4) The transparent resin stamper was mold-released with a disc releasing apparatus (manufactured by Origin Electric Co., Ltd.) to prepare the evaluation sample disc.

It may be noted that the thickness of the transparent resin intermediate layer as the sum thickness of the 2P resin layer and the second ultraviolet-curable resin layer was found to be 50 μm±5 μm.

An evaluation sample disc B was prepared as follows: the procedures down to the method (4) were the same as those in preparation of the evaluation sample disc A except that the first recording layer and the reflecting layer formed in the evaluation sample disc A were not formed; thereafter, the thus prepared preform of the evaluation sample disc B was coated with a tetrafluoropropanol (hereinafter, referred to as TFP) solution of an azo dye having a maximum absorption wavelength of 600 nm to form a 100-nm-thick dye layer, and thus the evaluation sample disc B was prepared.

By using the evaluation sample discs A thus obtained, the following evaluations (I) to (IV) were conducted, and by using the sample discs B thus obtained, the following evaluation (V) was conducted. The results thus obtained are shown in Table 2. It is to be noted that in principle, evaluation operation was repeated twice for each of the evaluations to prepare Table 2.

(I) Evaluation of the Mold-Release Performance from the Transparent Resin Stamper Both of the transparent resin stamper and the polycarbonate substrate were visually observed, and the occurrence/nonoccurrence of the adhesion of the transparent resin intermediate layer and the occurrence/nonoccurrence of the exfoliation of the dye layer were determined. The case where neither the adhesion of the transparent resin intermediate layer nor the exfoliation of the dye layer occurred was marked with ○ (good), and the case where either one or both of the adhesion and the exfoliation occurred was marked with X (not good).

(II) Evaluation of the Transfer Performance from the Transparent Resin Stamper

The transparent resin intermediate layer on which the asperity pattern of the transparent resin stamper was transferred was observed with a scanning probe microscope (SPI3800N/SPA300, manufactured by Seiko Instruments Inc.). The transfer percentages (land width and land height) of the asperity pattern were derived from the following formulas, and the case where the transfer percentage was 95% or more was marked with ○ (good), and the case where the transfer percentage was less than 95% was marked with X (not good).

Transfer percentage (land width)=land width of the transparent resin intermediate layer÷land width (0.3 μm) of the transparent resin stamper×100(%)

Transfer percentage (land height)=land height of the transparent resin intermediate layer÷land height (200 nm) of the transparent resin stamper×100 (%)

(III) Evaluation of the Warping of the Disc Substrate

The magnitude of the warping of the sample disc was measured with Prometheus MT-146 manufactured by Dr. Schenk Co., Ltd. The cases where the radial deviation at a radius of 56 mm was 0.4° or less, 0.4° to 0.8°, and 0.8° or more were marked with ⊚ (very good), ○ (good) and X (not good), respectively.

(IV) Durability Test of the Transferred Asperity Pattern

The sample disc was allowed to stand in an environment of 80° C. and 85% RH (relative humidity) for 500 hours, and thereafter the asperity pattern shape was measured with the scanning probe microscope. The percentage of the change between before and after the durability test was derived for each of the land width and the land height from the following formulas; the case where the percentage was less than 5% was marked with ○ (good), and the case where the percentage was 5% or more was marked with X (not good).

Change percentage (land width)=(land width after durability test−land width before durability test)÷land width before durability test×100(%)

Change percentage (land height)=(land height after durability test−land height before durability test)÷land height before durability test×100(%)

(V) Test for the Resistance to Dye Diffusion

The following test was conducted for the purpose of evaluating the suppression ability of the dye diffusion into the transparent resin intermediate layer under high temperature and high humidity.

The sample disc B was allowed to stand in an environment of 80° C. and 85% RH (relative humidity) for 500 hours, and thereafter the dye layer was washed with TFP sufficiently. The disc after the washing was visually observed; the case where almost no absorption of the dye was found was marked with ⊚ (very good), the case where slight absorption was found was marked with ○ (good), and the case where strong absorption was found was marked with X (not good).

Although the concerned sample disc for evaluation corresponds to a one-layer portion of the multilayer optical disc, the evaluation of the transparent resin intermediate layer can be sufficiently carried out with the sample disc for evaluation.

As can be seen from the results shown in Table 2, the ultraviolet-curable resin composition of the present invention satisfies the performances required for the 2P resin in the mold-release performance from the transparent resin stamper and the transfer performance from the transparent resin stamper; the obtained disc is excellent in the warping of the disc substrate and in the durability of the transferred asperity pattern, has a dye-diffusion suppression ability even under high temperature and high humidity, and is excellent particularly in the mold-release performance from the transparent resin stamper made of polycarbonate resin and in the warping of the disc substrate, as compared to the disc obtained from the composition of Comparative Example 1 not containing the (A) component.

TABLE 1

|  |  | Example 1 | Example 2 | Example 3 | Example 4 | Example 5 | Example 6 |
|---|---|---|---|---|---|---|---|
| Compound (A) | R-604 | 95 | 50 | 50 | 60 |  |  |
|  | R-684 |  | 45 |  |  | 60 | 70 |
| Compound (C) having two or more (meth)acryloyl groups | TMPTA |  |  | 45 |  |  |  |
|  | T-1420 (T) |  |  |  | 35 |  |  |
|  | PET-30 |  |  |  |  | 35 |  |
|  | M-315 |  |  |  |  |  | 35 |
|  | DPHA |  |  |  |  |  |  |
|  | TPGDA |  |  |  |  |  |  |
|  | NPG-2P |  |  |  |  |  |  |
| Mono(meth)acrylate compound (D) | LA |  |  |  |  |  |  |
|  | AM-30PG |  |  |  |  |  |  |
|  | FA-512A |  |  |  |  |  |  |

TABLE 1-continued

| | | | | | | | |
|---|---|---|---|---|---|---|---|
| Photopolymerization initiator (B) | Irgacure 184 Speed TPO | 5 | 5 | 5 | 5 | 5 | 5 |
| Viscosity [mPa·s/25° C.] | | 309 | 203 | 178 | 410 | 233 | 411 |

| | | Example 7 | Example 8 | Example 9 | Example 10 | Example 11 | Example 12 | Comparative Example 1 |
|---|---|---|---|---|---|---|---|---|
| Compound (A) | R-604 | 55 | 50 | 50 | 50 | 50 | 50 | |
| | R-684 | | | | | | | |
| Compound (C) having two or more (meth)acryloyl groups | TMPTA | | | | | | | 50 |
| | T-1420 (T) | | | | | | 35 | 45 |
| | PET-30 | | 35 | 35 | | | | |
| | M-315 | | | | | | | |
| | DPHA | 25 | | | 25 | 25 | | |
| | TPGDA | 20 | | | | | | |
| | NPG-2P | | 10 | 10 | | | | |
| Mono(meth)acrylate compound (D) | LA | | | | 20 | | | |
| | AM-30PG | | | | | 20 | | |
| | FA-512A | | | | | | 10 | |
| Photopolymerization initiator (B) | Irgacure 184 | 5 | 5 | 4 | 5 | 5 | 5 | 5 |
| | Speed TPO | | | 1 | | | | |
| Viscosity [mPa·s/25° C.] | | 207 | 263 | 281 | 93 | 131 | 420 | 177 |

TABLE 2

| Evaluation items | | Example 1 | Example 2 | Example 3 | Example 4 | Example 5 | Example 6 |
|---|---|---|---|---|---|---|---|
| Transparent resin stamper | | ZEONOR/Polycarbonate | | | | | |
| (1) Evaluation of mold-release performance from the transparent resin stamper | | ○/○ | ○/○ | ○/○ | ○/○ | ○/○ | ○/○ |
| (2) Evaluation of transfer performance from the transparent resin stamper | Transfer percentage (land width) | ○/○ | ○/○ | ○/○ | ○/○ | ○/○ | ○/○ |
| | Transfer percentage (land height) | ○/○ | ○/○ | ○/○ | ○/○ | ○/○ | ○/○ |
| (3) Evaluation of warping of the disc substrate | | ◎/◎ | ◎/◎ | ○/○ | ○/○ | ○/○ | ○/○ |
| (4) Durability test of the transferred asperity pattern | Change percentage (land width) | ○/○ | ○/○ | ○/○ | ○/○ | ○/○ | ○/○ |
| | Change percentage (land height) | ○/○ | ○/○ | ○/○ | ○/○ | ○/○ | ○/○ |
| (5) Test for resistance to dye diffusion | | ○/○ | ○/○ | ◎/◎ | ◎/◎ | ◎/◎ | ◎/◎ |
| Overall evaluation | | ○ | ○ | ◎ | ◎ | ◎ | ◎ |

| Evaluation items | | Example 7 | Example 8 | Example 9 | Example 10 | Example 11 | Example 12 | Comparative Example 1 |
|---|---|---|---|---|---|---|---|---|
| Transparent resin stamper | | ZEONOR/Polycarbonate | | | | | | |
| (1) Evaluation of mold-release performance from the transparent resin stamper | | ○/○ | ○/○ | ○/○ | ○/○ | ○/○ | ○/○ | ○/X |
| (2) Evaluation of transfer performance from the transparent resin stamper | Transfer percentage (land width) | ○/○ | ○/○ | ○/○ | ○/○ | ○/○ | ○/○ | ○/○ |
| | Transfer percentage (land height) | ○/○ | ○/○ | ○/○ | ○/○ | ○/○ | ○/○ | ○/○ |
| (3) Evaluation of warping of the disc substrate | | ○/○ | ○/○ | ○/○ | ◎/◎ | ◎/◎ | ◎/◎ | X/X |
| (4) Durability test of the transferred asperity pattern | Change percentage (land width) | ○/○ | ○/○ | ○/○ | ○/○ | ○/○ | ○/○ | ○/○ |
| | Change percentage (land height) | ○/○ | ○/○ | ○/○ | ○/○ | ○/○ | ○/○ | ○/○ |
| (5) Test for resistance to dye diffusion | | ◎/◎ | ◎/◎ | ◎/◎ | ◎/◎ | ◎/◎ | ◎/◎ | ◎/◎ |
| Overall evaluation | | ◎ | ◎ | ◎ | ◎ | ◎ | ◎ | X |

INDUSTRIAL APPLICABILITY

The cured product of the ultraviolet-curable resin composition of the present invention is excellent in the properties such as the transfer performance from the transparent resin stamper and the mold-release performance from the transparent resin stamper, and hence is useful as the transparent resin intermediate layer in a multilayer optical disc having at least two recording layers.

The invention claimed is:

1. A multilayer optical disc comprising at least two recording layers and a cured transparent resin intermediate layer between the at least two recording layers, wherein a surface of the cured transparent resin intermediate layer has guide grooves therein, wherein the guide grooves are formed by a 2P method and wherein one of said at least two recording layers is formed on said guide grooves, and wherein said cured transparent resin intermediate layer is formed from an ultraviolet-curable resin composition comprising:
   (A) dioxane glycol di(meth)acrylate and/or tricyclodecane dimethylol di(meth)acrylate; and
   (B) a photopolymerization initiator.

2. The multilayer optical disc according to claim 1, wherein said ultraviolet-curable resin composition further comprises (C) a compound having in a molecule thereof at least two (meth)acryloyl groups.

3. The multilayer optical disc according to claim 2, comprising 15 to 85% by weight of the (A) component, 0.1 to 10% by weight of the (B) component and 10 to 80% by weight of the (C) component in relation to a weight of the whole resin composition.

4. The multilayer optical disc according to claim 2, wherein said ultraviolet-curable resin composition further comprises (D) a mono(meth)acrylate compound.

5. The multilayer optical disc according to claim 4, comprising 15 to 85% by weight of the (A) component, 0.1 to 10% by weight of the (B) component, 8 to 80% by weight of the (C) component and 5 to 40% by weight of the (D) component in relation to the weight of the whole resin composition.

6. The multilayer optical disc according to any one of claims 2 to 5, wherein the compound (C) having in the molecule thereof at least two or more (meth)acryloyl groups comprises one or more selected from the group consisting of trimethylolpropane triacrylate, pentaerythritol triacrylate, ditrimethylolpropane tetraacrylate, tris[acroyloxyethyl] isocyanurate, dipentaerythritol hexaacrylate, tripropylene glycol diacrylate and neopentylglycol polypropoxy diacrylate.

7. The multilayer optical disc according to claim 4, wherein the mono(meth)acrylate compound (D) comprises one or more selected from the group consisting of dicyclopentenyl oxyethyl acrylate, lauryl acrylate and methoxytripropylene glycol acrylate.

8. The multilayer optical disc according to any one of claims 1 to 4, wherein the photopolymerization initiator (B) is 1-hydroxy-cyclohexyl phenyl ketone or 2,4,6-trimethylbenzoyl diphenyl phosphine oxide.

9. The multilayer optical disc according to any one of claims 1 to 5, wherein the viscosity of the composition at 25° C. measured with a B-type viscometer is 30 to 800 mPa·s.

* * * * *